US011132715B2

(12) United States Patent
Menendez et al.

(10) Patent No.: US 11,132,715 B2
(45) Date of Patent: Sep. 28, 2021

(54) SYSTEMS AND METHODS FOR PROVIDING TARGETED ADVERTISEMENTS TO A CHARGING STATION FOR ELECTRIC VEHICLES

(71) Applicant: Volta Charging, LLC, San Francisco, CA (US)

(72) Inventors: Michael Menendez, Honolulu, HI (US); Scott Mercer, San Francisco, CA (US)

(73) Assignee: Volta Charging, LLC, San Francisco, CA (US)

( * ) Notice: Subject to any disclaimer, the term of this patent is extended or adjusted under 35 U.S.C. 154(b) by 122 days.

(21) Appl. No.: 15/954,469

(22) Filed: Apr. 16, 2018

(65) Prior Publication Data

US 2018/0232772 A1 Aug. 16, 2018

Related U.S. Application Data

(62) Division of application No. 14/796,604, filed on Jul. 10, 2015, now abandoned.
(Continued)

(51) Int. Cl.
*G06Q 30/02* (2012.01)
*B60L 53/30* (2019.01)
(Continued)

(52) U.S. Cl.
CPC ........ *G06Q 30/0268* (2013.01); *B60L 53/305* (2019.02); *B60L 53/31* (2019.02);
(Continued)

(58) Field of Classification Search
CPC .......... G06Q 30/0268; G06Q 30/0244; G06Q 30/0269; G06Q 30/0261; G06Q 30/0271;
(Continued)

(56) References Cited

U.S. PATENT DOCUMENTS 6,727,809 B1 4/2004 Smith
8,169,186 B1 * 5/2012 Haddad ................... B60L 53/65
320/109
(Continued)

FOREIGN PATENT DOCUMENTS

JP 2006-113819 A 4/2006
JP 2010-113314 A 5/2010
(Continued)

OTHER PUBLICATIONS

International Search Report and Written Opinion dated Nov. 30, 2015 for PCT/US2015/039883 (15 pgs.).
(Continued)

*Primary Examiner* — Mario C. Iosif
(74) *Attorney, Agent, or Firm* — Morgan, Lewis & Bockius LLP

(57) ABSTRACT

Systems and methods are described which provide targeted advertisements to a charging station for electric vehicles. A data collector records data associated with individuals near a charging station. A meter determines whether the charging station is being used to charge an electric vehicle. When the charging station is being used, a display displays advertisements targeted to the individuals. The targeted advertisements are selected from a database according to the data recorded by the data collector, and the database stores advertising content with discrete advertising segments that are electronically accessible. A processor is coupled to the data collector, the meter, and the display. The processor transmits the data recorded by the data collector, and receives the targeted advertisements.

9 Claims, 9 Drawing Sheets

Related U.S. Application Data

(60) Provisional application No. 62/022,910, filed on Jul. 10, 2014.

(51) Int. Cl.

| | | |
|---|---|---|
| *B60L 53/31* | (2019.01) | |
| *B60L 53/63* | (2019.01) | |
| *B60L 53/66* | (2019.01) | |
| *B60L 53/67* | (2019.01) | |
| *B60L 53/68* | (2019.01) | |

(52) U.S. Cl.
CPC .............. *B60L 53/63* (2019.02); *B60L 53/66* (2019.02); *B60L 53/67* (2019.02); *B60L 53/68* (2019.02); *G06Q 30/0244* (2013.01); *G06Q 30/0255* (2013.01); *G06Q 30/0261* (2013.01); *G06Q 30/0269* (2013.01); *G06Q 30/0271* (2013.01); *B60L 2240/60* (2013.01); *B60L 2250/16* (2013.01); *B60L 2250/20* (2013.01); *B60L 2250/22* (2013.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y04S 10/126* (2013.01)

(58) Field of Classification Search
CPC ........ B60L 53/30; B60L 53/305; B60L 53/63; B60L 53/31; B60L 53/60; B60L 2240/60; Y02T 90/161; Y02T 90/163; Y02T 10/7291; Y02T 90/128; Y02T 10/7088; Y02T 90/121; Y02T 90/14; Y02T 10/7005; Y04S 10/126; Y02E 60/721
See application file for complete search history.

(56) References Cited

U.S. PATENT DOCUMENTS

| | | | |
|---|---|---|---|
| 9,346,365 B1* | 5/2016 | Penilla .................... | B60L 53/14 |
| 2007/0024580 A1 | 2/2007 | Sands et al. | |
| 2008/0249867 A1 | 10/2008 | Angell et al. | |
| 2010/0094496 A1 | 4/2010 | Hershkovitz et al. | |
| 2010/0277584 A1 | 11/2010 | Price | |
| 2011/0191186 A1 | 8/2011 | Levy et al. | |
| 2011/0193522 A1 | 8/2011 | Uesugi | |
| 2011/0196745 A1 | 8/2011 | Moriya | |
| 2011/0204847 A1* | 8/2011 | Turner ............... | G06Q 30/0269 |
| | | | 320/109 |
| 2011/0213656 A1 | 9/2011 | Turner | |
| 2012/0116575 A1* | 5/2012 | Prosser ................ | G06Q 20/202 |
| | | | 700/232 |
| 2012/0126748 A1 | 5/2012 | Haddad et al. | |
| 2012/0143693 A1 | 6/2012 | Chung et al. | |
| 2012/0158502 A1* | 6/2012 | Chung ............... | G06Q 30/0255 |
| | | | 705/14.53 |
| 2012/0233077 A1 | 9/2012 | Tate, Jr. et al. | |
| 2013/0090936 A1 | 4/2013 | Solomon et al. | |
| 2013/0110632 A1 | 5/2013 | Theurer et al. | |
| 2013/0110666 A1 | 5/2013 | Aubrey | |
| 2013/0127416 A1* | 5/2013 | Karner ................. | G06Q 20/102 |
| | | | 320/109 |
| 2013/0218356 A1* | 8/2013 | Lee ......... | G06Q 50/06 |
| | | | 700/291 |
| 2013/0339156 A1 | 12/2013 | Sanjay et al. | |
| 2014/0074626 A1 | 3/2014 | Fukuhara | |
| 2014/0129337 A1 | 5/2014 | Otremba et al. | |
| 2014/0160280 A1 | 6/2014 | Rodriguez et al. | |
| 2015/0084838 A1 | 3/2015 | Chang et al. | |
| 2015/0088644 A1* | 3/2015 | Shay ................. | G06Q 30/0254 |
| | | | 705/14.52 |
| 2016/0292713 A1 | 10/2016 | Chen et al. | |
| 2017/0371608 A1 | 12/2017 | Wasserman | |

FOREIGN PATENT DOCUMENTS

| | | |
|---|---|---|
| JP | 2011-196745 A | 10/2011 |
| JP | 2012-182872 A | 9/2012 |
| JP | 2012-205461 A | 10/2012 |
| JP | 2017-522458 A | 8/2017 |
| WO | WO2013019989 A2 | 2/2013 |

OTHER PUBLICATIONS

Menendez, Notice of Reasons for Rejection, JP2017-522458, dated Sep. 26, 2019, 12 pgs.
Menendez, Office Action, U.S. Appl. No. 14/796,604, dated Sep. 19, 2018, 13 pgs.
Menendez, Final Office Action, U.S. Appl. No. 14/796,604, dated Mar. 21, 2019, 16 pgs.
Menendez, Office Action, U.S. Appl. No. 14/796,604, dated Dec. 27, 2019, 18 pgs.
Menendez, Office Action, U.S. Appl. No. 14/796,604 dated Jan. 6, 2020, 13 pgs.
Menendez, Final Office Action, U.S. Appl. No. 15/954,476, dated Jun. 2, 2020, 20 pgs.
Volta Industries, LLC, Communication Pursuant to Rule 164(2)(b) and Article 94(3), EP15739482.6, Nov. 27, 2018, 11 pgs.
Menendez, Notice of Final Rejection, JP2017-522458, dated May 29, 2020, 6 pgs.
Menendez, Notice of Reasons for Rejection, JP2019-212232, dated Sep. 24, 2020, 5 pgs.
Menendez, Office Action, U.S. Appl. No. 15/954,476, dated Sep. 30, 2020, 22 pgs.
Volta Industries, LLC, Summons to Attend Oral Proceedings Pursuant to Rule 115(1), EP15739482.6, dated Sep. 22, 2020, 9 pgs.

\* cited by examiner

| | TECH | EDUCATION | CAR | FASHION | HEALTH | TOYS | MOVIES/TV |
|---|---|---|---|---|---|---|---|
| FEMALE CHILD | +2 | +2 | +0 | +3 | +2 | +5 | +2 |
| MALE CHILD | +2 | +2 | +1 | +1 | +2 | +5 | +2 |
| FEMALE ADULT | +3 | +3 | +3 | +5 | +4 | +1 | +3 |
| MALE ADULT | +5 | +3 | +5 | +2 | +4 | +1 | +3 |
| FEMALE SENIOR | +2 | +0 | +2 | +2 | +5 | +1 | +2 |
| MALE SENIOR | +2 | +0 | +3 | +1 | +5 | +1 | +2 |

FIG. 2

SYSTEMS AND METHODS FOR PROVIDING TARGETED ADVERTISEMENTS TO A CHARGING STATION FOR ELECTRIC VEHICLES

CROSS REFERENCE TO RELATED APPLICATION

This application is a divisional of and claims priority under 35 USC 120 to U.S. patent application Ser. No. 14/796,604 filed Jul. 10, 2015 and entitled "Systems And Methods For Providing Targeted Advertisements To A Charging Station For Electric Vehicles" that in turn claims the benefit under 35 USC 119(e) to U.S. Provisional Application No. 62/022,910, filed on Jul. 10, 2014, all of which are hereby incorporated herein by reference in its entirety.

TECHNICAL FIELD

This disclosure relates generally to charging stations for electric vehicles, including without limitation, systems and methods that provide targeted advertisements to a charging station for electric vehicles.

BACKGROUND

Consumer demand for electric vehicles such as electric battery powered vehicles or hybrid vehicles is increasing, but one disadvantage that holds electric vehicles from becoming more popular is their battery power requirements. Electric vehicles need to be charged, and charging stations are costly to install and maintain. To incentivize the use of electric vehicles, charging services in public locations may be provided free-of-charge. Instead of charging drivers of electric vehicles to use the charging stations, revenue may be generated via advertisements displayed on the charging stations. There exists a need for a streamlined process for selecting and providing advertisements to charging stations for electric vehicles.

SUMMARY

Accordingly, systems and methods are disclosed herein for providing targeted advertisements to charging stations for electric vehicles. The systems and methods can be adapted to provide targeted advertisements that are selected based on the characteristics of one or more individuals who are near the charging stations.

One aspect relates to a charging station for electric vehicles. The charging station comprises a data collector, a meter, a display, and a processor. The data collector records data associated with individuals who are near the charging station. To protect privacy rights of the individuals, the data collector may be programmed to discard high resolution data associated with the individuals. The meter determines whether the charging station is being used to charge an electric vehicle. The selected targeted advertisements may be selected based on whether the charging station is being used to charge an electric vehicle. The display displays advertisements targeted to the individuals, where the targeted advertisements are selected from a database according to the data recorded by the data collector, and the database stores advertising content with discrete advertising segments that are electronically accessible. The processor is coupled to the data collector, the meter, and the display, and is configured to transmit, over a network to a server, the data recorded by the data collector. The processor also receives, over the network from the server, the selected targeted advertisements from the database, and provides the selected targeted advertisements to the display.

In some implementations, the charging station includes a counter that tracks an estimated number of individuals who are proximate the charging station. The data collector may be a camera that records video signals at the charging station, and the counter provides information that is redundant to the recorded video signals. The counter may include an infrared sensor, an ultrasonic sensor, or both.

In some implementations, the data associated with individuals comprises physical features of the individuals. The physical features of the individuals may include at least two of the group consisting of age, height, race, clothes patterns, and logos.

In some implementations, the processor processes the recorded data to determine whether the individuals are engaging with the display. For example, a length of time that the individuals are engaging with the display may be measured. Whether the individuals are engaging with the display may be determined by detecting whether the individuals make eye contact with the display, whether the individuals are facing the display, whether the individuals make a gesture toward the display, or a combination thereof. A second selected targeted advertisement may be selected based on whether the individuals are engaging with a first selected targeted advertisement on the display.

One aspect relates to a computer-implemented method of providing targeted advertisements on a display near a charging station for electric vehicles. The method includes receiving, at a server, a computational model that predicts a relative length of time that an individual will engage with a candidate advertisement in a plurality of candidate advertisements. The computational model is generated based on data collected from a plurality of individuals, a plurality of advertisements, and measured lengths of time that the plurality of individuals engage with the plurality of advertisements. A plurality of user features characterize each individual in the plurality of individuals, and a plurality of advertisement features characterize each advertisement in the plurality of advertisements. The method includes receiving, in real time, an indication that a target individual is engaging with the display and a plurality of target user features that characterize the target individual. A plurality of scores is assessed for the target individual based on the plurality of target user features and the computational model, wherein each score in the plurality of scores is indicative of a predicted relative length of time associated with the target individual and a candidate advertisement in the plurality of candidate advertisements. A targeted advertisement is selected from the plurality of candidate advertisements based at least in part on an optimization performed on the plurality of scores, and the targeted advertisement is provided to the display.

In some implementations, the target individual is a first target individual and the plurality of target user features is a plurality of first target user features, and the method further includes receiving, in real time, an indication that a second target individual is interacting with the display and a plurality of second target user features that characterize the second target individual, wherein the first target individual is a user of the charging station and the second target individual is not a user of the charging station. Meter data may be received from a meter at the charging station, where the meter data provides an estimated length of time until the first target individual's use of the charging station is complete. One of the first target individual and the second target individual may be selected based on the estimated length of time, and the plurality of target user features that characterize the selected target individual may be provided to the computational model to assess the plurality of scores. In an example, the first target individual is selected when the estimated length of time is below a threshold, and the second target individual is selected when the estimated length of time is above the threshold.

In some implementations, a mode of operation is selected based on whether the charging station is being used to charge an electric vehicle, wherein the mode of operation determines whether a driver of the electric vehicle is the target individual. For example, a first mode is selected when the charging station is being used to charge an electric vehicle, and the driver of the electric is the target individual. A second mode may be selected when the charging station is not being used to charge an electric vehicle, and target individual is an individual near the charging station.

In some implementations, selecting the targeted advertisement is based at least in part on a set of previously displayed advertisements on the charging station. The predicted relative length of time corresponds to an amount of user involvement with the display, and the candidate advertisement associated with a predicted length of time that exceeds a threshold may be selected as the targeted advertisement. The amount of user involvement may include not only the predicted relative length of time, but also a predicted relative extent of engagement between the individual and the candidate advertisement. For example, the extent of engagement may correspond to whether an individual causes other individuals to engage with the display. The extent of engagement may correspond to a detected strength of the engagement, as determined by whether the individual makes eye contact with the display or faces the display, for example. In particular, the extent of engagement may correspond to a comparison between the total length of time that the individual makes eye contact with the display and the duration of the advertisement. The total length of time may be measured according to the longest continuous time interval during which eye contact is made while an advertisement is shown on the display. Alternatively, the total length of time may be measured according to a sum total of the possibly multiple time intervals during which eye contact is made. The extent of engagement may correspond to a ratio between the total length of time and the duration of the advertisement.

In some implementations, the length of time that the target individual engages with the display is determined, and the computational model is updated according to the determined length of time, the plurality of target user features, and a plurality of target advertisement features that characterize the targeted advertisement.

On aspect relates to a method for enabling users to identify one or more available charging stations for electric vehicles. The method includes receiving, at a processor in real time, station data indicative of a plurality of charging stations, where the station data includes locations of the charging stations and indicates whether each of the charging stations is available or unavailable. A map is displayed to a user in real time on a mobile device. The map includes first markers for the locations of the available charging stations and second markers for the locations of the unavailable charging stations. The first markers and the second markers are updated in real time on the map according to when charging stations become available and unavailable. The method includes determining when the user initiates a charging process between the user's electric vehicle and a selected charging station selected from the available charging stations. Meter data recorded by a meter at the selected charging station is received, where the meter data includes an estimated length of time remaining until the charging process is complete. The estimated length of time is displayed to the user over the mobile device.

In some implementations, a plurality of businesses that are near the selected charging station is identified, and one or more promotional offers associated with each of the plurality of businesses are identified. At least one promotional offer is selected from the plurality of promotional offers based at least in part on the estimated length of time remaining until the charging process is complete, and the selected at least one promotional offer is transmitted to the mobile device. In an example, the estimated length of time remaining until the charging process is complete is compared to a threshold. A first business is located closer to the selected charging station than a second business, and the selected promotional offer may be selected based on the estimated length of time and the location of the businesses. In particular, when the estimated length of time remaining is less than the threshold, the selected promotional offer is associated with a first business in the plurality of businesses. When the estimated length of time remaining is greater than the threshold, the selected promotional offer is associated with a second business in the plurality of business.

In some implementations, additional messages are displayed to the user over the mobile device. In an example, a message is displayed to the user indicating that the electric vehicle is unplugged from the selected charging station. In an example, a message is transmitted to the mobile device when the charging process is complete.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure that represents a score output of a computational model, according to an illustrative implementation.

DETAILED DESCRIPTION OF ONE OR MORE EMBODIMENTS

Described herein are systems and methods that provide targeted advertisements to a charging station for electric vehicles. To provide an overall understanding, certain illustrative implementations will now be described, including a system for providing targeted advertisements to a display on a charging station for electric vehicles. However, it will be understood by one of ordinary skill in the art that the systems and methods described herein may be adapted and modified as is appropriate for the application being addressed and may be employed in other suitable applications, and that such other additions and modifications will not depart from the scope thereof. In particular, the systems and methods of the present disclosure may be adapted for use in any system that is suitable for displaying a targeted advertisement in an existing system that already receives user data One way to promote the use of electric vehicles it to provide complimentary charging services at locations where drivers can be occupied while their vehicles charge, such as at malls, restaurants, and movie theaters. However, installing and maintaining a charging station is costly, and a company is unlikely to be willing to provide complimentary charging services, unless advertising revenue can be generated from the charging stations. To ensure that advertisements have a desired effect, computational systems and methods are described herein for providing targeted advertisements to various individuals who come within a range of a charging station. The data collected using the systems and methods of the present disclosure provide valuable information for advertisers and companies who provide charging stations in that the data informs what types of advertisements are more or less engaging for certain types of individuals. Moreover, the present disclosure describes systems and methods for distinguishing between users who charge their electric vehicles at a charging station and other individuals who are near the charging station. Distinguishing between these types of individuals may be advantageous because there may be more available data regarding users of the charging station compared to other individuals. When more data is available, the targeted advertising methods may perform better with respect to selecting advertisements to maximize levels of user engagement.

Figure 1:
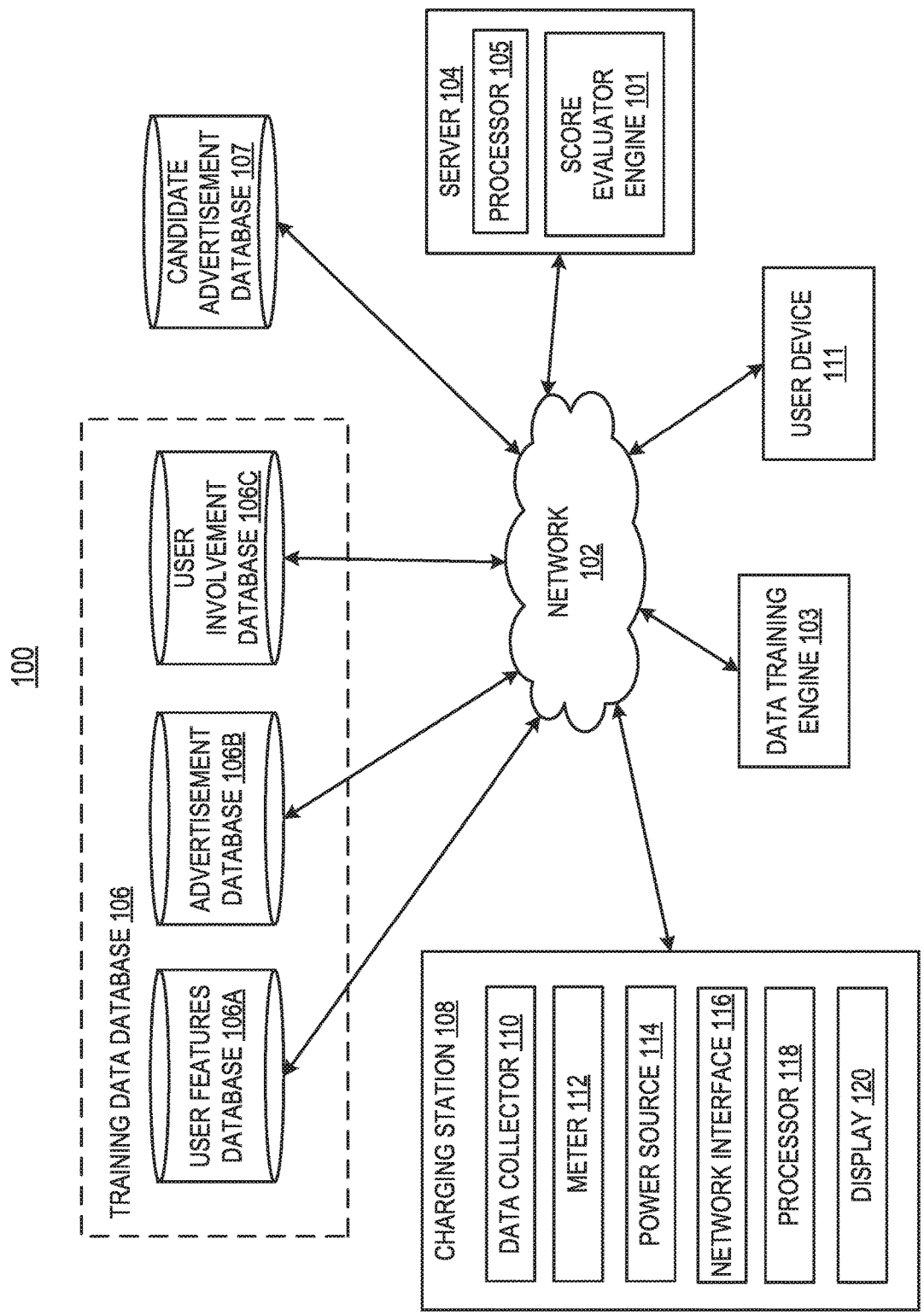
FIG. 1 is a block diagram of a computerized system for providing targeted advertisements to a charging station, according to an illustrative implementation.

FIG. 1 is a block diagram of a computerized system 100 for providing advertisements targeted for individuals on a charging station for electric vehicles, according to an illustrative implementation. The system 100 includes a server 104, a user device 111, a data training engine 103, a training data database 106, and a charging station 108, all of which are connected to one another over a network 102. The training data database 106 stores data related to individuals, groups of individuals, advertisements, and amounts of user interaction with the advertisements. In particular, the training data database 106 includes three databases—a user features database 106A, an advertisement database 106B, and a user involvement database 106C. The server 104 includes a processor 105 and a score evaluator engine 101 that assesses scores for target individuals that interact with the charging station 108. The charging station 108 includes a data collector 110, a meter 112, a power source 114, a network interface 116, a processor 118 and a display 120.

As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that is currently being processed. An illustrative computing device 900, which may be used to implement any of the processors and servers described herein, is described in detail below with reference to FIG. 9. As used herein, "user device" includes, without limitation, any suitable combination of one or more devices configured to communicate with a server and/or a charging station over a network. Examples of user devices include, without limitation, personal computers, laptops, and mobile devices (such as smartphones, blackberries, PDAs, tablet computers, etc.). Only one server 104, one user device 111, one data training engine 103, one training data database 106, and one charging station 108 are shown in FIG. 1 to avoid complicating the drawing. In general, the system 100 can support multiple servers, user devices, or charging stations, and the data training engine 103 and the training data database 106 may be implemented on a single system or on multiple distributed systems.

The system 100 provides advertisements on the display 120 of the charging station 108. The advertisements are selected by the server 104 specifically to be targeted for one or more individuals who are detected to be interacting with the display 120 on the charging station 108. In particular, the data collector 110 on the charging station 108 is configured to collect data associated with one or more individuals who exhibit an interest in the display 120, which may be a digital monitor or a screen that is configured to display advertisements or other information. The display 120 may be interactive such that individuals may interact with the display 120 by providing input via an input device (e.g., keypads, touch screens, trackballs, voice recognition systems, etc.).

The data collector 110 is a surveillance device and includes one or more of a video camera, a digital camera, a web cam, an infrared sensor, an ultrasonic sensor, a three-dimensional laser scanner, a microphone, or any other suitable device that is configured to record data related to one or more individuals. Processing of the raw data collected by the data collector 110 may be performed locally at the charging station 108, or may be performed remotely at the server 104. The data recorded by the data collector 110 may be processed to determine whether an individual is interacting with the display 120. For example, an individual may be interacting with the display 120 when the individual makes eye contact with the display 120, or when the individual's body or face is directed toward the display 120. Upon determining that the individual is interacting with the display 120, the individual may be selected as a target individual, and the individual's features may be used as target features.

The processor 116 may be configured to process the data recorded by the data collector 110 to detect whether an individual is interacting with the display 120. In this case, the processor 116 transmits the user features of the target individual to the server 104 for processing and for running the predictive model. Alternatively, the processor 116 may transmit at least some of the raw data recorded by the data collector 110 to the server 104 for processing to determine whether a target individual is interacting with the display 120. In some embodiments, the processor 116 performs some pre-processing, such as determining that there is an individual proximate the charging station 108, and only transmits the data recorded by the data collector 110 to the server 104 when an individual is proximate the charging station 108. This may be desirable such that bandwidth over the network 102 is saved.

In some embodiments, it is desirable to avoid infringement of the individuals' privacy rights. In this case, any high resolution data detected by the data collector 110 may not be recorded or saved, or if such data is recorded, the data may be discarded. In this case, the data collector 120 may only detect the general outline of an individual who is in the range of the data collector 120. Even such data at low resolution may provide sufficient information for determining whether the individual is facing the display 120 or otherwise paying attention to the display 120. Moreover, when an individual is physically interacting with the display 120, such as by providing input via an input device like a touch screen or a microphone, the data collected by the input device may supplement the data collected by the data collector 110.

The server 104 executes a process referred to herein as an advertisement selection function, which selects an advertisement from a set of candidate advertisements stored on the candidate advertisement database 107. The advertisement selection function may be triggered when an individual is interacting with the display 120 on the charging station 108. Interaction may be determined by processing data recorded by the data collector 110 or by detecting user provided input data via an input device on the charging station 108. The selected advertisement is targeted specifically for the target individual who is interacting with the display 120.

In particular, the server 104 may receive or determine features associated with the individual, and these features are provided to the score evaluator engine 101, which assesses an individual-specific score for each candidate advertisement in a set of candidate advertisements. The individual-specific score corresponds to a predicted amount or degree of user involvement that is predicted to occur between the individual and the candidate advertisement. The advertisement with the highest score may be selected to be provided over the display 120 to the individual. The process for selecting an advertisement from a set of candidate advertisements is described in detail in relation to FIG. 6.

The score evaluator engine 101 assess scores for the set of candidate advertisements by applying a computational model to the set of candidate advertisements and user features of the individual. The computational model is in the form of a set of rules generated by the data training engine 103, which performs a machine learning technique on a training data set stored on the training data database 106. As shown in FIG. 1, the training data database 106 is a distributed system of three databases that store user feature data, advertisement data, and user involvement data. In general, the data stored in the training data database 106 may be stored on the same database or any number of different databases located on the same device or distributed over multiple locations. The data stored in the user features database 106A, the advertisement database 106B, and the user involvement database 106C are described in detail below, and are used by the data training engine 103 to train a predictive model that may predict an amount of user involvement between a user and an advertisement.

The user features database 106A, the advertisement database 106B, and the user involvement database 106C store training data that is used by a machine learning technique to train a computational model. As used herein, to "train" a data set means to generate a set of rules that accurately predict an amount of user involvement for users and advertisements with particular features. Training a data set to obtain a rule set is described in detail in relation to FIG. 7.

The machine learning technique involves receiving two inputs—an input vector and an answer vector. As used herein, the input vector refers to data that is stored in the user features database 106A and data stored in the advertisement database 106B. The answer vector refers to data stored in the user involvement database 106C. The machine learning technique applies statistical modeling methods to fit a computational model to predict the answer vector based on the input vector. A computational model that performs well is able to accurately predict the amount of user involvement (i.e., the answer vector) that is exhibited by a user who has particular user features in response to an advertisement with particular advertisement features (i.e., the input vector).

The training data stored in the training data database 106 may be collected over a period of time during which various advertisements with different advertisement features (stored in the advertisement database 106B) are shown to various users with different user features (stored in the user features database 106A). The training data may be collected while advertisements are displayed on one or more charging stations 108, or may be collected in a completely different environment. Amounts of user involvement or degrees of user engagement with the advertisements are monitored and stored in the user involvement database 106C. After enough training data (with both input vector and answer vector data) is collected, the data training engine 103 generates the computational model that can predict an unknown answer (i.e., an amount of user involvement) for a known input (i.e., a set of user features and a set of advertisement features).

The user features database 106A includes data associated with the user that may provide predictive information regarding an amount of user involvement with an advertisement. Instead of storing personal identifying information regarding each user, the data stored in the user features database 106A assigns different users to different categories of user features. For example, the user features database 106A may include user features that may be estimated from data recorded by the data collector 110. Examples of user features include but are not limited to age, gender, race, demographic, height, or any other suitable user feature that may be determined from data recorded by the data collector 110. Moreover, user features may include information such as what clothing or accessories the individual is wearing, or objects that the individual is carrying, such as shopping bags or foods and beverages. In this case, one or more logos may be detected from the data recorded by the data collector 110, and the logo information may be included as one or more of the user features.

In some embodiments, the user features database 106A includes data related to both individuals and groups of individuals, and may further distinguish across different types of groups of individuals, such as between a group that includes children (e.g., a family) and a group that includes individuals around the same age (e.g., a group of friends). In particular, the user features database 106A may include features that characterize a group of individuals, such as how many individuals there are in the group and the relative height or age differences between the individuals in the group, for example.

Upon detecting a group of individuals from the data recorded by the data collector 110, the server 104 may select a targeted advertisement for an specific to the target group or for a target individual in the group. In an example, the user features of each of the individuals within the target group may be processed to assign individual-specific scores for each individual. The individual-specific scores may be aggregated across the individuals to form a group-specific score, and the candidate advertisement with the group-specific score that exceeds a threshold may be selected. In this manner, the advertisement that is displayed to the group of individuals is selected to maximize or increase the likelihood that the target group of individuals will direct attention to the display 120.

In an example, one of the individuals in the group is selected for targeted advertising. In this case, a level of involvement for each individual in the group may be monitored, and the selected individual may be associated with the highest level of involvement. The data collector 110 may determine that the selected individual has been directing attention to the display 120 for the longest amount of time out of anyone in the group. In an example, if the server 104 recognizes that one of the individuals is a child, the server 104 may select the child as the target individual. In this manner, targeted advertisements directed towards the child may be shown on the display 120. Alternatively, the server 104 may recognize that one of the individuals is an adult accompanied by a child. The server 104 may select the adult as the target individual, and the targeted advertisements may be selected to be directed towards the adult. These advertisements may involve promoting products or services related to childcare.

The advertisement database 106B includes data associated with a set of advertisements that may have been previously displayed to individuals having the user features defined in the user features database 106A. In particular, the data stored on the advertisement database 106B may correspond to various advertisement features that characterize an advertisement. As an example, an advertisement feature may correspond to a type of product or service that the advertisement promotes. As another example, an advertisement feature may correspond to a characteristic of the advertisement itself, such as the duration of the advertisement. An advertisement feature may correspond to any audio or visual characteristic of the advertisement, such as whether the advertisement is very vibrant or colorful, or whether the advertisement includes animation or cartoons. As another example, an advertisement feature may include a level of interactivity associated with the advertisement, such as whether the advertisement is responsive to user input, such as via an input device or a user movement detector. In general, any type of feature that characterizes an advertisement or the product or service that the advertisement is promoting may be used. Various categories of advertisement features are shown and described in relation to FIG. 2.

The user involvement database 106C includes data regarding a measured amount of user involvement between a user with particular user features (stored in the user features database 106A) and a particular advertisement (stored in the advertisement database 106B). The measured amount of user involvement may correspond to a length of time that the user interacted with the advertisement, a degree of attention that the user exhibited to the advertisement, or a combination of both. For example, the measured amount of user involvement may correspond to a length of time that the user made eye contact with the display 120 showing the advertisement, or a length of time that the user faces the display 120 while the advertisement is shown. In another example, the measured amount of user involvement may depend on whether the user engaged one or more other individuals to direct their attention to the display or to the advertisement. This may be evidence that a particular advertisement is particularly engaging for that user. In this case, the amount of user involvement for a user who draws in an additional audience for the advertisement may be greater than that for a user who does not draw in an additional audience. In general, any data associated with user involvement may be stored in the user involvement database 106C.

As described above, the data training engine 103 performs a machine learning technique on the training data stored on the training data database 106. The result of the machine learning technique is a set of rules that define the computational model. The data training engine 103 provides the computational model over the network 102 to the score evaluator engine 101, which uses the model to assign scores to a set of candidate advertisements using real-time user feature data.

The candidate advertisements are stored on the candidate advertisement database 107, which may be stored on the same system as the training data database 106 or a separate system. In some embodiments, the candidate advertisement database 107 is the same as the advertisement database 106B. In other embodiments, the candidate advertisement database 107 includes advertisements that are not included in the advertisement database 106B. The candidate advertisements may be a set of advertisements specific to the geographic location of the charging station 108, such as advertisements for local business or regional products and services. The candidate advertisements may include new advertisements that have not been previously used (and therefore not used in training the computational model).

The real-time user feature data is collected in real time from the data collector 110, and may be associated with unknown or uncertain amounts of user involvement for the different candidate advertisements. The computational model provides a prediction of the amounts of user involvement by assessing a score for each candidate advertisement. In this manner, the computational model allows for prediction of an amount or degree of user involvement that the real time individual will interact with an advertisement. The server 104 may select the advertisement with the maximum score or a score that exceeds a threshold, and the selected advertisement is provided over the network 102 for display on the charging station 108.

The user device 111 may be a personal computer, laptop computer, tablet, a mobile device or any other device that may be used by a user to determine the location and availability of the charging station 108. In an example, the user device 111 is a mobile device that displays a map of a driver's current location and indications that point to various locations of nearby charging stations. The map may include different indicators for available charging stations and unavailable charging stations. A charging station 108 may be unavailable if it is currently in use or if it is currently down for maintenance or is otherwise being serviced. The map displayed on the user device 111 may further include a timing indicator that describes an estimated amount of time left until an unavailable charging station becomes available. An example method for displaying various messages over the user device 111 to the user is described in detail in relation to FIG. 8.

In some embodiments, the data associated with a user account accessed via the user device 111 informs the user features data that is used as an input into the computational model. In particular, a user may register for an account with services provided by the server 104, and the user accesses the account over the user device 111. In particular, the account information may include data regarding the user that may not be easily determined from the data recorded by the data collector 110. For example, the account information may include data associated with the model, make, and/or year of one or more vehicles owned or used by the user, insurance information, household information, or any other suitable user information that may be used to selected targeted advertisements for the user. In an example, the user may select to link the account associated with the server 104 with one or more other user accounts that have information on the shopping habits or online browsing habits of the user. In this manner, the server 104 retrieves and uses information about the user that may not be determined from the data collector 110. In some embodiments, the account information includes data regarding geographic data associated with the user, such as the areas corresponding to the user's locations at various times. Targeted advertisements for businesses with retail locations in these areas may be selected for displaying to the user.

In some embodiments, the data collector 110 distinguishes between a driver and a passerby, and the server 104 may operate in one of two modes—providing targeted advertisements to the driver or providing targeted advertisements to a passerby. In particular, the data collector 110 may identify an individual who plugs in an electric vehicle into the charging station 108 as a driver. Alternatively, the data collector may identify an individual who exits the vehicle from the driver side door as a driver. Upon recognizing an individual as a driver, the data collector 110 may track the movement of the driver and distinguish the driver from other individuals who are within the range of the data collector 110.

When the data collector recognizes the driver, the data collector 110 may determine that the driver is interacting with the display 120. In this case, the server 104 may select a targeted advertisement for the driver based on not only the user feature data recorded by the data collector 110, but also the account information associated with the driver's user account. If no account information is available, or if the driver does not have a user account, then the targeted advertisement may be selected for the driver based on a combination of the user feature data of the driver as well as vehicle information determined when the electric vehicle is plugged into the charging station 108. For example, the vehicle information may include the make, model, and/or year of the vehicle. In this manner, because more data is known about drivers of electric vehicles than of passersby, the targeted advertisement that is provided by the server 104 may be better targeted for the driver than for a passerby. In this manner by being able to distinguish between drivers and non-drivers, the charging station 108 is able to provide enhanced targeted advertisements for drivers compared to non-drivers.

In some embodiments, the server 104 forms a prediction regarding whether a driver will interact with the display 120 based on the data collected by the meter 112. In particular, the meter data may indicate that a large amount of time remains before charging is complete. In this case, the server 104 may predict that the driver is unlikely to remain at the charging station 108 while the electric vehicle is being charged. Thus, the server 104 may select advertisements to target users who are passing by the charging station 108. Alternatively, if a small amount of time is left before the charging is complete, the server 104 may predict that the driver is likely to remain at the charging station 108 during the charging process, and may select advertisements to target the driver. When the driver uses the user device 111 such as a mobile phone, the server 104 may detect that the driver has returned to the charging station 108 using a location indicator signal on the phone such as a GPS signal.

Upon detecting the driver's return, the server 104 may update the display 120 on the charging station 108 to provide a targeted advertisement for the driver.

In some embodiments, the data collector 110 includes a redundancy counter device in addition to a camera. In an example, the user features of the individuals who come within the range of the data collector 110 may be collected by the camera, and a redundancy counter may be used to count the number of individuals. The redundancy counter may be in the form of an ultrasonic sensor or an infrared sensor, and may be used to confirm that the data recorded by the data collector 110 is accurate.

The components of the system 100 of FIG. 1 may be arranged, distributed, and combined in any of a number of ways. For example, the components of system 100 may be distributed over multiple processing and storage devices connected via the network 102. Such an implementation may be appropriate for distributed computing over multiple communication systems including wireless and wired communication systems that share access to a common network resource. In some implementations, the system 100 is implemented in a cloud computing environment in which one or more of the components are provided by different processing and storage services connected via the Internet or other communications system.

Although FIG. 1 depicts a network-based system for providing a targeted advertisement to a display on a charging station, the functional components of the system 100 may be implemented as one or more components included with or local to the charging station 108. Additionally, the functions performed by each of the components in the system of FIG. 1 may be rearranged. In some implementations, either or both of the processors 114 and 105 may perform some or all of the functions of the server 104, charging station 108, data training engine 103, or user device 111, as described herein. For ease of discussion, the remainder of this disclosure will often describe providing targeted advertisements with reference to the system 100 of FIG. 1. However, any suitable variations of the system 100 may be used without departing from the scope of this disclosure.

FIG. 2 is an example data structure 200 that represents a simplified score output of a computational model that is based on a set of user features and a set of advertisement features. In the data structure 200, six example categories of user features are listed in the left most column and seven example categories of advertisement features are listed in the top row. The categories of user features include a gender of an individual and an approximate age range of an individual, and the categories of advertisement features include various types of advertisements such as technology, education, car, fashion, health, toys, and movies/television. The numbers in the data structure 200 correspond to a score for a corresponding category of user features (denoted by the row) and a corresponding category of advertisement features (denoted by the column). A higher score may correspond to a higher predicted level of involvement for a user that is classified into a user category and an advertisement that is classified into an advertisement category.

The categories for user features and the advertisement features in the data structure 200 are shown for illustrative purposes only. As shown in the data structure 200, each category of user features includes two features relating to the gender and age range of an individual, and each category of advertisement features includes a single feature related to the type of product or service that the advertisement is promoting. One of ordinary skill in the art will understand that any number of any suitable features may be used. In particular, a category of user features or a category of advertisement features may include a single feature or multiple features. In an example, user feature data may include information regarding individual demographic data, race information, additional age ranges, or any other user data suitable for being used to select a targeted advertisement for an individual. Moreover, as described in relation to FIG. 1, the user features may include data related to groups of individuals, such as families.

The advertisement features may include features regarding the product or service that is being promoted in the advertisement. The advertisement features shown in FIG. 2 simply correspond to the general category of the product or service, but in general, the general categories may be divided into sub-categories. For example, the fashion category may be divided according to children's fashion, teenage fashion, women's fashion, and men's fashion. Similarly, the health category may be divided into child health, female health, male health, or senior citizen health. The movies/TV category may be divided into various genres such as family friendly entertainment, documentaries, dramas, comedies, or any other suitable category of entertainment. In some embodiments, the advertisement features include features regarding the advertisement itself, such as its duration, whether the advertisement is interactive, and/or any visual characteristics associated with the advertisement. Moreover, an advertisement feature may include whether the advertisement is associated with a local business, or a product that is specific to the region. While the categories of advertisement features shown in FIG. 2 only include a single advertisement feature per category, the categories may include any number of advertisement features.

In some embodiments, the categories for the user features and the advertisement features are determined based on whether enough training data exists, and/or based on the training process that is executed by the data training engine 103. For example, a 15 second long movie advertisement may be in the same or different category from a 30 second long movie advertisement. In particular, the advertisements may be in different categories if enough training data is collected to separate movie advertisements into different categories based on duration. However, if there is not enough training data, then the advertisements may be grouped together into the same category. In general, if separating the movie advertisement category into multiple categories based on the advertisement's duration improves the performance of the computational model, then the two advertisements may be separated into the different categories. The categories for user features may be similarly determined, according to the performance of the model.

Figure 3:
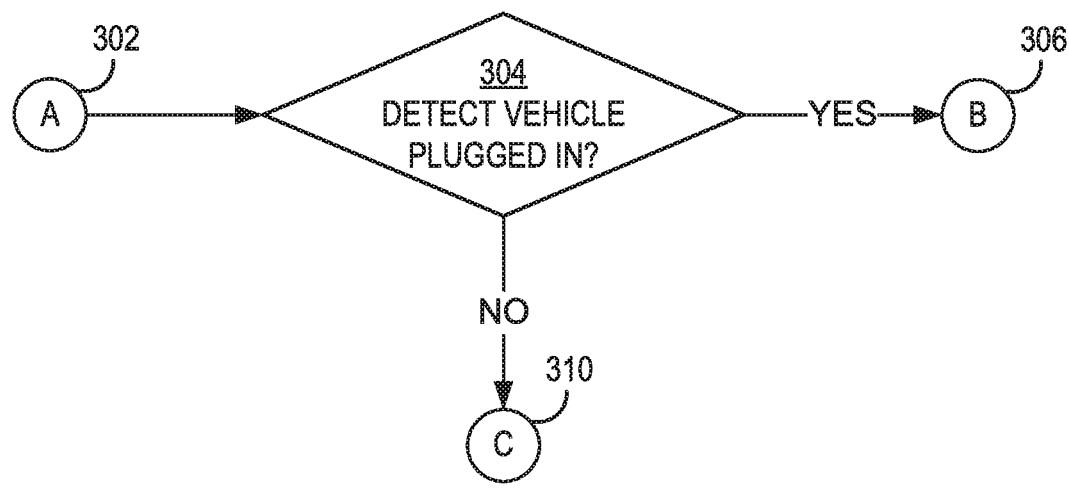
FIG. 3 is a flowchart of a method used by a computerized system to detect whether a vehicle is plugged into a charging station, according to an illustrative implementation.

FIG. 3 is a flow chart of an illustrative method 300 for detecting whether a vehicle is plugged into the charging station 108. The method 300 may be executed by the server 104 or the charging station 108 and includes the step of determining whether an electric vehicle is plugged into the charging station at decision block 304. Depending on whether an electric vehicle is plugged into the charging station 108, the server 104 may select to operate in one of two modes. If a vehicle is plugged in, the server 104 may select to operate in a first mode at 306, which provides targeted advertisements to a user associated with the vehicle, such as the driver or a passenger. The first mode is described in detail in relation to FIG. 4.

Alternatively, if there is no vehicle plugged into the charging station 108, the server 104 may select to operate in a second mode at 310, which provides targeted advertisements to individuals who pass by the charging station 108. The second mode is described in detail in relation to FIG. 5. The charging station 108 may be configured to switch between the first mode, the second mode, and any other number of modes depending on whether a vehicle is currently charging at the charging station 108. For example, if a vehicle is plugged in, the charging station 108 may operate in the first mode, until the server 104 detects that the driver is not interacting with the display 120. In this case, the charging station 108 may switch to the second mode to provide targeted advertisements to individuals who pass by the charging station 108 or to provide a generic advertisement.

Figure 4:
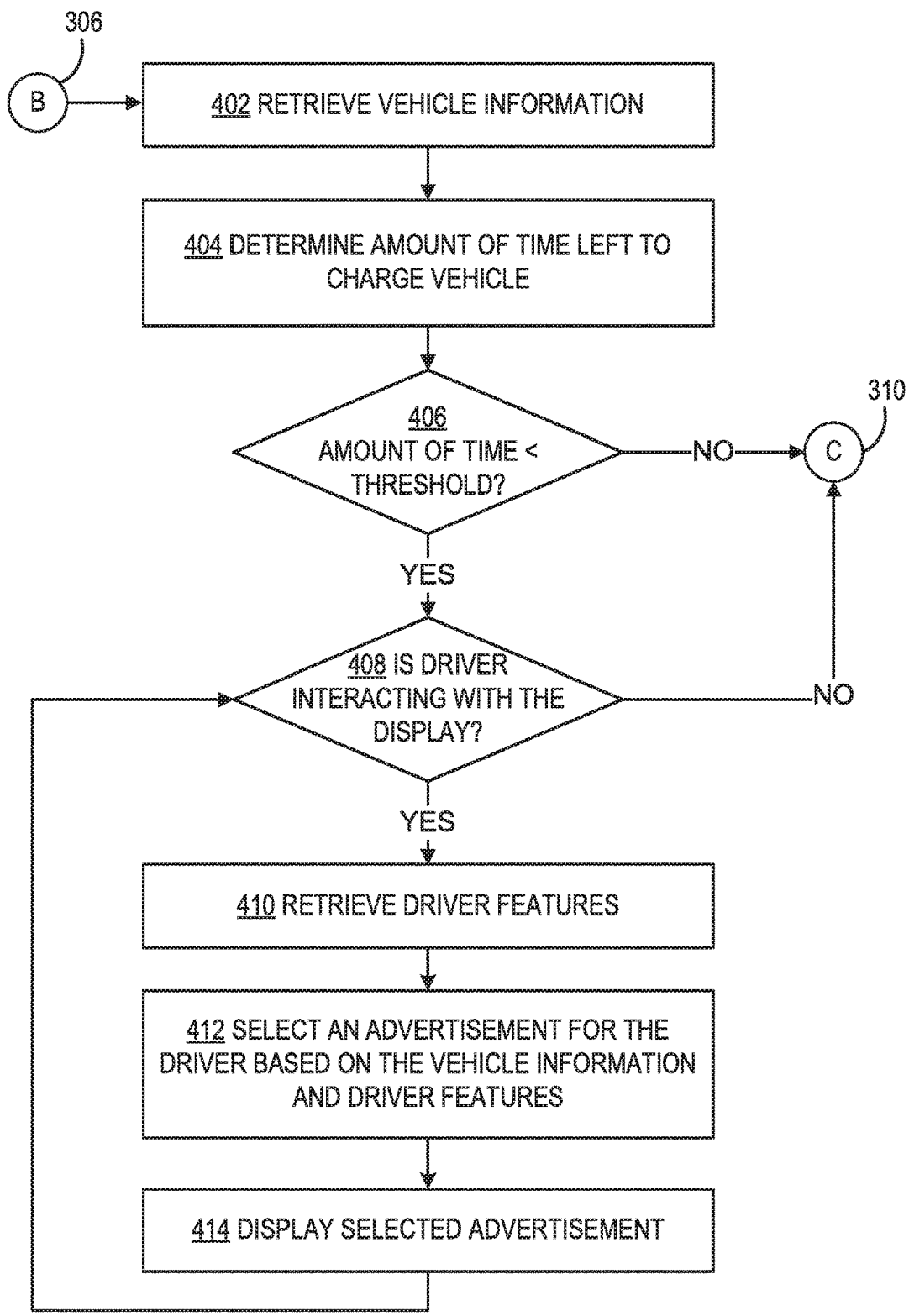
FIG. 4 is a flowchart of a method used by a computerized system to provide a targeted advertisement to a driver of an electric vehicle, according to an illustrative implementation.

FIG. 4 is a flow chart of an illustrative method 400 that may be executed upon determining that a vehicle is plugged into the charging station 108. The method 400 may be executed by the server 104 and includes the steps of retrieving vehicle information (step 402), determining an amount of time left to charge the vehicle (step 404), and determining whether the amount of time is less than a threshold (decision block 406). If so, the server 104 determines that the driver is interacting with the display (decision block 408), retrieves driver features (step 410), selects an advertisement for the driver based on the vehicle information in driver features (step 412), and displays the selected advertisement (step 414). Alternatively, if the amount of time is greater than the threshold, or if the server 104 determines that the driver is not interacting with the display, then the method 400 proceeds to 310 to operate in the second mode described in relation to FIG. 5.

At step 402, upon detecting that an electric vehicle is plugged into the charging station 108, the server 104 retrieves vehicle information associated with the electric vehicle that is plugged in. In an example, the vehicle information is determined based on data retrieved by the power source 114, which is configured to determine vehicle data when the vehicle is plugged into the power source 114. In this case, the vehicle data may include the make, model, year, battery power, or any other suitable data detectable by the power source 114. In an example, the vehicle information is determined based on data recorded by the data collector 110, which detects various characteristics of the vehicle, such as shape, color, type, or any other suitable vehicle characteristic. In an example, the vehicle information is determined based on the user device, which may communicate with the charging station 108 or may be detected by the data collector 110. In this case, vehicle information may be associated with a user account, which the driver accesses over the user device 111. The charging station 108 or the server 104 may be able to detect that the user device 111 is within a close proximity to the charging station 108, and may access the vehicle information via the user's account. In this case, the vehicle information may include insurance policy data associated with the vehicle or any other data related to the vehicle.

At step 404, the server 104 determines an amount of time that is left to charge the vehicle. As described in relation to FIG. 1, the amount of time left is determined by the meter 112. The amount of time left may correspond to the total estimated amount of time remaining before the charging of the vehicle is complete and the vehicle is fully charged. Alternatively, users of the charging station 108 may be limited to predefined time intervals, and the amount of time left may correspond to the amount of time remaining in the time interval. The predefined time intervals may be used to discourage drivers from leaving their vehicles plugged into the charging station 108 for extended periods of time.

At decision block 406, the server 104 determines whether the amount of time left to charge the vehicle is below a threshold. Comparing the remaining amount of time to a threshold may be useful for predicting a likelihood of the driver remaining at the charging station 108 until charging is complete. For example, if there is a small remaining amount of time, the server 104 may predict that the driver will remain at the charging station 108 until charging is complete. In this case, the targeted advertisements shown on the display 120 may be selected specifically for the driver. Alternatively, if there is a large remaining amount of time, the server 104 may predict that the driver will not remain at the charging station 108. In this case, the targeted advertisements may be selected for the general public or for other individuals who are passing by the charging station 108. This is described in detail in relation to FIG. 5.

In this manner, the amount of remaining time may inform a decision regarding whether to target a driver or a passerby in providing advertisements on the charging station 108. Use of such information may be advantageous because it may be generally preferred to target a driver over a passerby. In general, the predictive model that scores the candidate advertisements may have better performance if more information regarding the targeted individual is known. The server 104 may be able to obtain more information about a driver than a passerby, because the driver information may include vehicle information and user account information. In contrast, the server 104 may only be able to obtain information regarding the physical characteristics of a passerby. Thus, performance of the model may be enhanced for the driver compared to a passerby, it may be preferred to target the driver over a passerby.

At decision block 408, the server 104 determines whether the driver is interacting with the display. The data collector 110 and the power source 114 operate together to detect when the driver plugs in the vehicle. In particular, when the power source 114 indicates that a vehicle is plugged into the charging station 108, this may trigger the data collector 110 to focus on the individual who is near the power source 114. The data collector 110 may track the individual's movement even after the vehicle is plugged in. In some embodiments, when a user other than the driver plugs the vehicle into the power source 114, the data collector 110 may detect the driver by tracking the movements of an individual who exits the vehicle from the driver side. In this manner, the data collector 110 may determine whether a driver remains near the charging station 108 while the vehicle is being charged, or whether the driver walks away from the charging station 108. If the driver walks away from the charging station 108, or if the server 104 otherwise determines that the driver is not interacting with the display 120, the method 400 proceeds to step 310, which is described in more detail in relation to FIG. 5.

Alternatively, if the data collector 110 provides an indication that the driver is interacting with the display, the method 400 proceeds to step 410 to retrieve driver features. The driver features may be retrieved from the data collector 110 or from the user device 111. In an example, the driver features may be determined based on physical characteristics of the driver that are detected by the data collector 110. In an example, the driver features may be determined based on the user device 111, which may communicate with the charging station 108 or may be detected by the data collector 110. In this case, the driver features may be associated with a user account, which the driver accesses over the user device 111. The charging station 108 or the server 104 may be able to detect that the user device 111 is within a close proximity to the charging station 108, and may access driver information via the user's account. In this case, the driver information may include insurance policy data, one or more address or contact information associated with the account, or any other data related to the driver.

At step 412, the server 104 selects an advertisement for the driver based on the vehicle information retrieved at step 402 and the driver features retrieved at step 410. The selected advertisement is targeted to the driver, and may be selected to maximize or at least increase the predicted amount of involvement between the driver and the display 120. An exemplary process for selecting an advertisement is described in more detail in relation to FIG. 6.

At step 414, the selected advertisement is displayed over the display 120. While the advertisement is being displayed, the data collector 110 may continue to monitor the amount of involvement exhibited by the driver in response to the selected advertisement. The training data may be updated in accordance with the monitored amount of involvement. In particular, data regarding the driver's features, the selected advertisement, and the exhibited amount of involvement may be provided to the training data database 106, and the databases may be updated accordingly to reflect the exhibited amount of interaction between the driver and the selected advertisement. The data may be provided in real time or periodically, to update the training data database 106. The computational model used to predict an amount of user interaction with candidate advertisements may also be appropriately updated as the training data database 106 is updated. The model may be updated (i.e., retrained) in real time as the training data database 106 is updated, or periodically, such as once a day, a week, a month, or any other suitable time period. In this manner, the data recorded by the data collector 110 is not only used to provide a targeted advertisement in real-time to the charging station 108, but is also used in future targeted advertising.

If the driver continues to interact with the display 120, the server 104 repeats steps 408, 410, 412, and 414 to select more advertisements that are targeted for the driver. However, if the data collector 110 provides an indication that the driver is no longer interacting with the display (such as by walking away or otherwise diverting his attention elsewhere, for example), then the method 400 proceeds to step 310 to provide targeted advertising to passersby or to a general audience.

Figure 5:
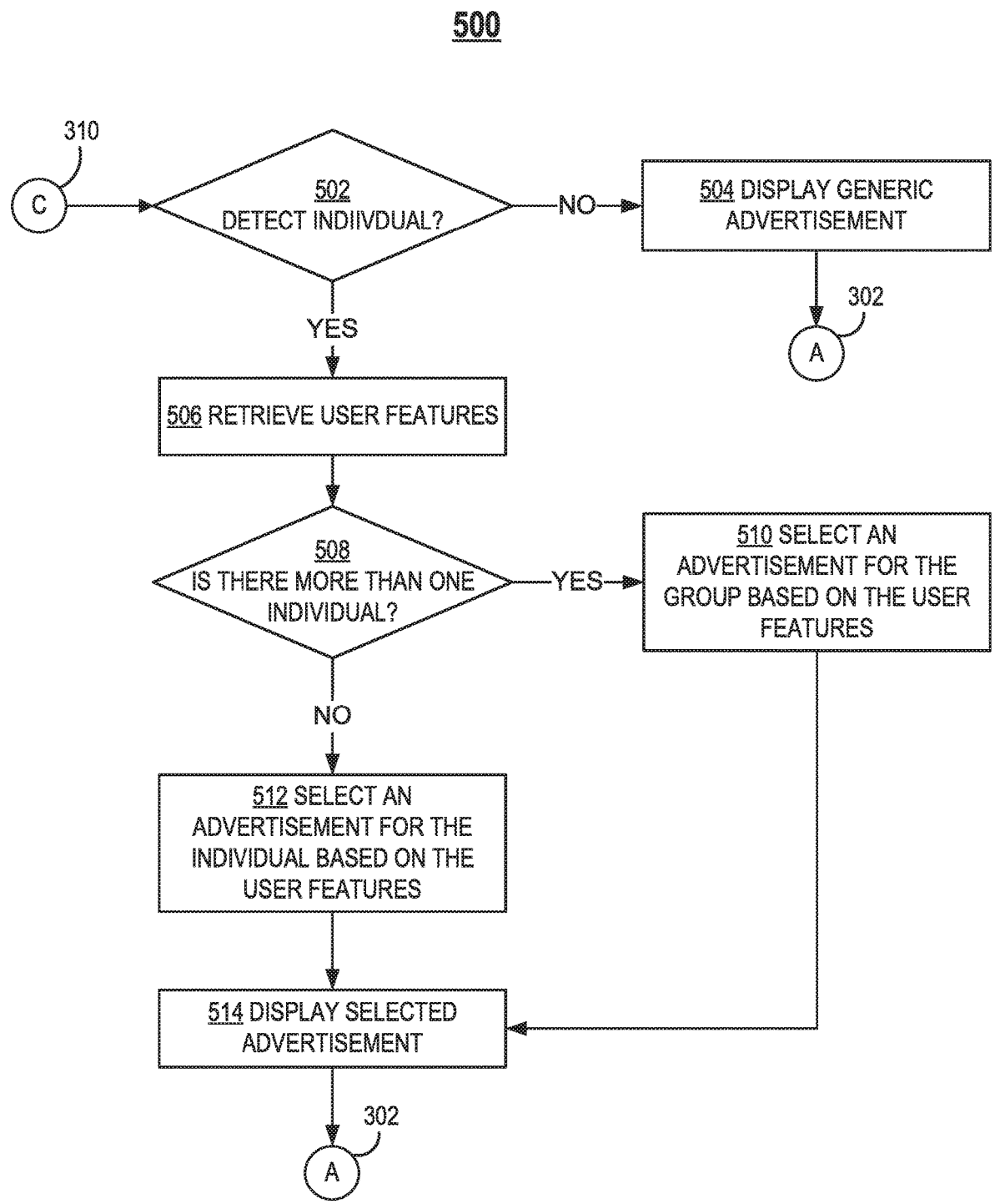
FIG. 5 is a flowchart of a method used by a computerized system to provide a targeted advertisement to one or more individuals who are near a charging station, according to an illustrative implementation.

FIG. 5 is a flowchart of an illustrative method 500 for providing targeted advertisements to one or more individuals who are near the charging station 108. The method 500 may be executed by the server 104 upon determining that a vehicle is not plugged into the charging station 108 at decision block 302. The method 500 includes the steps of determining whether an individual is detected (decision block 502). If not, a generic advertisement is displayed (step 504), and the method 500 returns to 302. Otherwise, if an individual is detected, the user features of the individual is retrieved (step 506), and the server 104 determines whether there is more than one individual (decision block 508). If so, an advertisement is selected for the group based on the user features (step 510), and if not, an advertisement is selected for the individual based on the user features (step 512). The selected advertisement is displayed (step 514), and the method 500 returns to the method described in relation to FIG. 3.

At decision block 502, the server 104 determines whether at least one individual is present within the range of the data collector 110. If no individual is detected, the server 104 selects a generic advertisement for display on the display 120 at step 504. The generic advertisement is not targeted towards any particular individual, and may be selected based on a subscription service offered to advertisers. In an example, some advertisers may pay a premium to have their advertisements provided as the generic advertisement. In some embodiments, the generic advertisement may be selected based on an optimization process performed for a hypothetical individual with certain user features. The user features for the hypothetical individual may be selected to be the average features across all users, or may be selected as the most frequently occurring features across all users. The set of users used to determine the user features of the hypothetical individual may be the entire set of global users, or may be limited to a particular geographic region.

At step 506, if an individual is detected within the range of the data collector 110, the user features of the individual are retrieved. As is described in relation to FIG. 1, the user features include any data associated with an individual or a group of individuals that provides predictive information regarding an amount of user involvement with an advertisement. Examples of user features include but are not limited to age, gender, race, demographic, height, or any other suitable user feature that may be determined from data recorded by the data collector 110. Moreover, user features may include information such as what clothing or accessories the individual is wearing, or objects that the individual is carrying, such as shopping bags or foods and beverages. In this case, one or more logos may be detected from the data recorded by the data collector 110, and the logo information may be included as one or more of the user features.

At decision block 508, the server 104 determines whether more than one individual is detected within the range of the data collector 110. If so, the server 104 proceeds to step 510 to select an advertisement for the group based on the user features determined at step 506. As is described in relation to FIG. 1, for each candidate advertisement, each individual may be assessed an individual score, and an aggregate score may be computed for the group. In an example, the aggregate score may correspond to a sum over the individual scores. The sum may be weighted if it is desirable to weight the scores of certain individuals more heavily than other individuals. The selected advertisement may correspond to the candidate advertisement that maximizes the aggregate score for the group. Alternatively, a subset including one or more individuals in the group may be selected, and an advertisement may be selected based on the selected subset.

Alternatively, if there is only one individual, the server 104 proceeds to step 512 to select an advertisement for the individual based on the user features determined at step 506. The selected advertisement is targeted to the individual, and may be selected to maximize or at least increase the predicted amount of involvement between the individual and the display 120. An exemplary process for selecting an advertisement is described in more detail in relation to FIG. 6. At step 514, the selected advertisement is displayed on the display 120.

Figure 6:
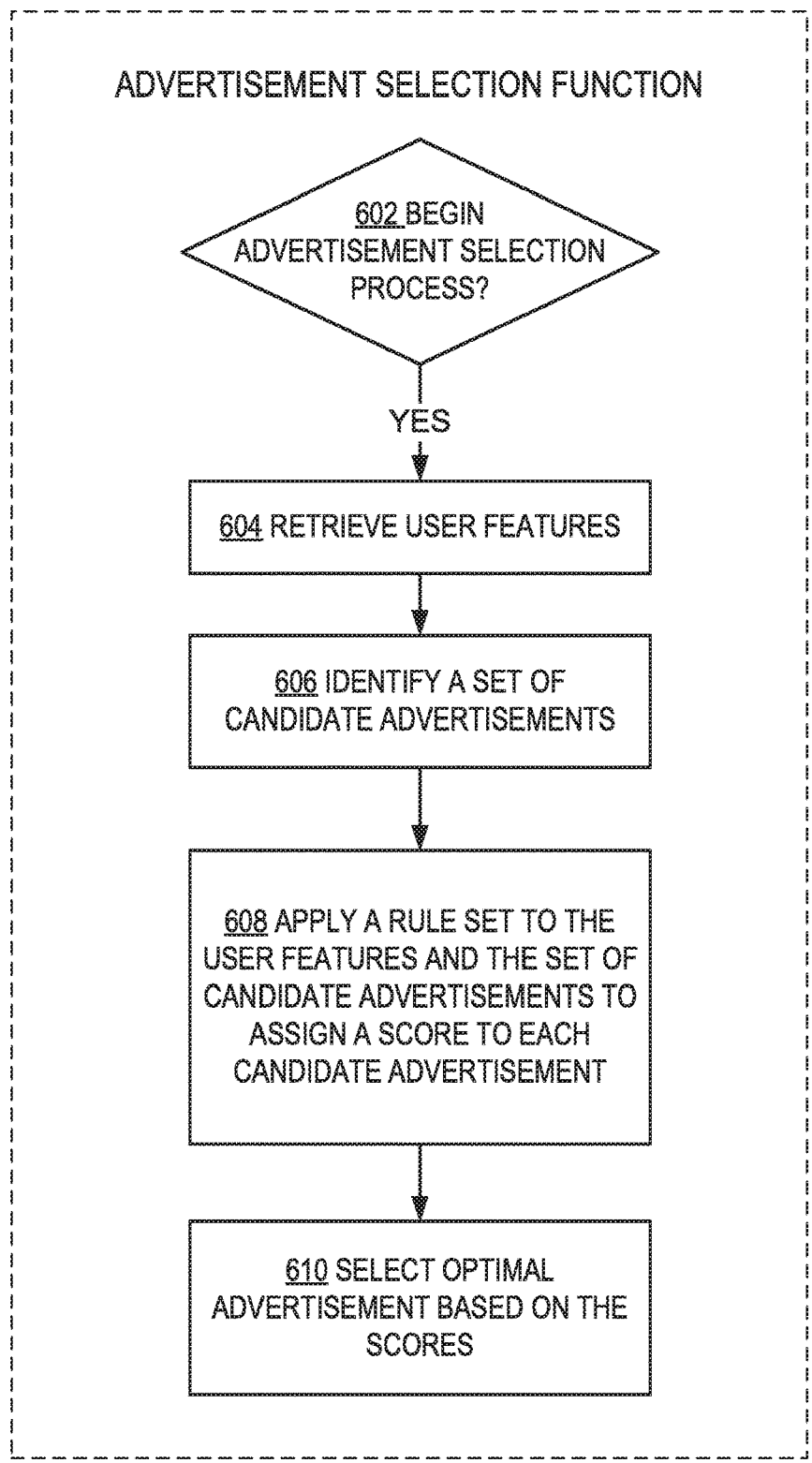
FIG. 6 is a flowchart of a method used by a computerized system to select an advertisement for display on an electric vehicle charging station, according to an illustrative implementation.

FIG. 6 is a flowchart of an illustrative method 600 for selecting an advertisement for display on a charging station for electric vehicles. The method 600 may be executed by the server 104 and includes the steps of determining whether to begin the advertisement of the selection process (decision block 602), retrieving user features (step 604), identifying a set of candidate advertisements (step 606), applying a rule set to the user features and the set of candidate advertisements to assign a score to each candidate advertisement (step 608), and selecting an optimal advertisement based on the scores (step 610).

At decision block 602, the server 104 determines to begin the advertisement selection process. As described herein, the server 104 may determine to begin the advertisement selection process in response to determining that one or more individuals are within the range of the data collector 110. The individual may be a driver of an electric vehicle or a passerby of the charging station 108.

At step 604, the server 104 retrieves user features of the one or more individuals. As described in relation to FIG. 2, the user features may include any data related to an individual or a group of individuals. Moreover, when the driver is within the range of the data collector 110, the user features may include user account data accessed over the user device 111. Moreover, as is described in relation to FIG. 5, the user features that are retrieved at step 604 may correspond to one individual or a group of individuals. When there is a group, the user features of a selected subset of individuals in the group may be retrieved, or the user features of each individual in the group may be retrieved.

At step 606, the server 104 identifies a set of candidate advertisements that may be stored on the candidate advertisement database 107 described in relation to FIG. 1. The candidate advertisements are a set of advertisements that are considered for displaying on the display 120. The set of candidate advertisements may be specific to the geographic location of the charging station 108, such as advertisements for local business or regional products and services. The candidate advertisements may include new advertisements that have not been previously used (and therefore not used in training the computational model). Even though the candidate advertisements may not have been previously shown, the candidate advertisements have known advertisement features, which are used by the computational model. In some embodiments, the set of candidate advertisements does not include advertisements that were recently displayed on the charging station 108 or another station proximate to the charging station 108.

At step 608, the server 104 applies a rule set to the user features and the set of candidate advertisements to assign a score to each candidate advertisement. To assess a score for each candidate advertisement, the score evaluator engine 101 uses a computational model that predicts an amount of interaction that an individual will have with each respective candidate advertisement. In an example, the amount of interaction may represent a length of time that the individual is predicted to interact with the advertisement. The computational model may include a weighted function of various features of one or more individuals and is described in more detail in relation to FIG. 2.

At step 610, the server 104 selects an optimal advertisement from the set of candidate advertisements based on the scores. In particular, the optimal advertisement may be the candidate advertisement with the maximum score, or the score that indicates the largest amount of predicted user involvement. In some embodiments, all of the candidate advertisements are scored before an advertisement is selected, such that the advertisement with the absolute maximum score is selected. In some embodiments, the optimal advertisement is selected before all of the scores are assessed if a candidate advertisement is determined to have a score that exceeds a predefined threshold. In this case, the score evaluator engine 101 iteratively selects a candidate advertisement and assesses the score for the selected advertisement. The server 104 may iteratively compare the assessed score to a predefined threshold, and the first candidate advertisement with a score that exceeds the threshold may be selected before all of the candidate advertisements are assessed. Whether all candidate advertisements are scored before the optimal advertisement is selected may be based on a tradeoff between the amount of time it takes to score each advertisement and a desire to get the absolute highest scoring advertisement. In particular, if there are many high scoring advertisements and scoring advertisements is computationally expensive, it is desirable to select the first candidate advertisement that has a score that exceeds a threshold. Alternatively, if there are few high scoring advertisements and scoring advertisements is computationally cheap, it may be desirable to score all candidate advertisements before selecting the optimal advertisement.

In some embodiments, the advertisement selection function is based on previously displayed advertisements. In particular, it may be undesirable to display the same advertisement twice within a single time interval, such that the advertisements that were recently displayed on the charging station 108 may not be considered or scored. In some embodiments, the selected advertisement is based on the interaction between one or more individuals and a previous advertisement. In an example, if a first advertisement generated a high amount of interaction, a second advertisement may be selected to have similar advertisement features. In particular, if the first advertisement involved user input (such as over a touch screen, for example) that was popular with the one or more individuals, the second advertisement shown to the one or more individuals may also involve user input. In this manner, an individual's response to one advertisement may inform the selection of the next advertisement shown to the individual.

In some embodiments, the advertisement selection function is based on one or more signals communicated over a group of charging stations 108. In particular, the group of charging stations 108 may be configured to send communications to one another via the network 102. In an example, each charging station 108 may include a memory for storing a map of its neighboring charging stations. As the data collector 110 on a first charging station detects one or more users that are interacting with the display 120 on the first charging station, the data collector 110 may detect that the one or more users are leaving the vicinity of the first charging station, and moving in a direction toward a neighboring charging station. In this case, the first charging station may transmit a signal to the neighboring charging station, where the signal may include information indicative of the one or more users, an advertisement history associated with any of the one or more users, or both. Upon receiving this signal, the neighboring charging station may then bypass the steps described in relation to the advertisement selection function 600 because these steps were already performed by the first charging station. In this case, the neighboring charging station is able to essentially capitalize on the processing already performed by the first charging station and may simply continue the process initiated by the first charging station. As an example, a current targeted advertisement that is displayed on the first charging station when the one or more users are determined to be moving in a direction toward the neighboring charging station may be directly transmitted to the neighboring charging station, which may then display the same targeted advertisement. Similarly, this process may be repeated when the neighboring charging station detects that the one or more users are leaving its own vicinity and heading in a direction toward another charging station.

In some embodiments, a default setting may not allow charging stations to communicate in the manner described above, to avoid possibly infringing on privacy rights of bystanders. However, other users (e.g., drivers or owners of electric vehicles) may be allowed to configure a user setting indicative of whether to allow for this type of communication between charging stations. In some embodiments, the charging stations communicate to one another via the server 104, which serves as a centralized unit that may store a station map that indicates the geographic location of each charging station 108 connected to the network 102. The server 104 may further store data regarding each charging station 108, including any data recorded (if any) by the data collector 108 and any advertisements shown on the display 120. As was described above, the data recorded by the data collector 108 may be limited to the general outline or a general direction that the one or more users is facing, and no specific personal data that would identify the one or more users. In this case, the server 104 may use the station map and the data regarding each charging station 108 to detect when one or more users are leaving a vicinity of one charging station and heading in a direction of another charging station, and may control the advertisements shown on the charging stations using this information.

Figure 7:
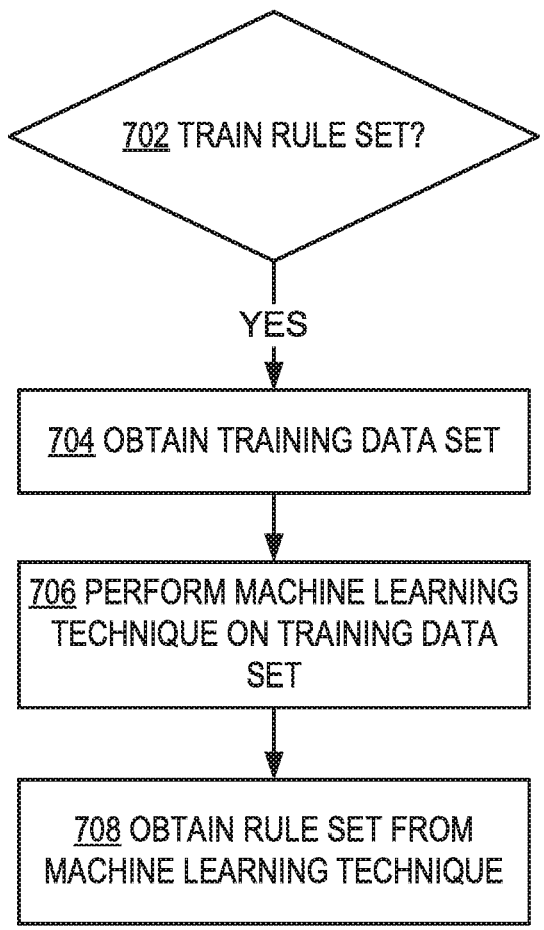
FIG. 7 is a flowchart of a method used by a computerized system to train a set of rules based on training data, according to an illustrative implementation.

FIG. 7 is a flowchart of an illustrative method 700 for training a set of rules based on training data that may be stored in the training data database 106. The method 700 may be executed by the data training engine 103 and includes the steps of determining whether to train a rule set (decision block 702), obtaining a training data set (step 704), performing a machine learning technique on the training data set (step 706), and obtaining a rule set from the machine learning technique (step 708).

At decision block 702, the data training engine 103 determines to train a rule set. In particular, the data training engine 103 may determine to begin a training process when a threshold amount of training data is stored in the training data database 106. After a first rule set is determined, the rule set may be updated (i.e., retrained) whenever the data in the training data database 106 is updated, such as whenever files in the training data database 106 are added, replaced, deleted, or modified. Alternatively, the rule set may be updated periodically, such as once every day, week, month, or any other suitable time interval. In some embodiments, as additional data (regarding user feature data, advertisement feature data, and amounts of user involvement) is collected by the data collector 110, the additional data is added to the training data database 106. The data training engine 103 may select to retrain a rule set when the training data in the training data database 106 changes by a threshold amount, compared to the state of the training data when the latest rule set was trained. In some embodiments, different rule sets are trained for charging stations in different geographical locations.

At step 704, the data training engine obtains a training data set. As described in relation to FIG. 1, the training data set may be stored on a database such as the training data database 106, which stores data associated with user features, advertisement features, and measured amounts of user involvement between users and advertisements.

At step 706, the data training engine performs a machine learning technique on the training data set. Performing the machine learning technique involves "training" the data set to generate a set of rules that accurately predict an amount of user involvement for users and advertisements with particular features. The machine learning technique involves receiving two inputs—an input vector and an answer vector. As used herein, the input vector refers to data that is stored in the user features database 106A and data stored in the advertisement database 106B. The answer vector refers to data stored in the user involvement database 106C. One purpose of the machine learning technique is to generate a predictive model that receives the input vector and is able to accurately predict the values in the answer vector.

In performing the machine learning technique, the data training engine 103 applies statistical modeling methods to fit the computational model to the training data. The computational model includes the set of rules that define how certain user features and advertisement features are predicted to affect the amount of user involvement. The predicted amount of involvement as predicted by the computational model are compared to the actual amounts of measured user involvement (i.e., the answer vector), which may be measured by the data collector 110 on the charging station 108. If the predicted amount of user involvement mostly matches the actual measured amount of user involvement, this means that the predictive model has performed well.

However, if there are substantial differences between the predicted amounts of involvement and the actual measured amounts of involvement, one or more parameters of the computational model are updated. Updating the computational model causes the predicted amount of involvement to also be updated, and the updated predicted amounts of involvement are compared to the actual measured amounts of involvement. These steps are repeated until the performance of the predictive model satisfies one or more criteria such as providing predictive results that sufficiently match the actual results. The one or more criteria may include an error criterion that indicates a maximum tolerable amount of error between the predictions and the measurements.

In some embodiments, the training data stored in the training data database 106 is separated into two disjoint portions—a training dataset and a testing dataset. In this case, the training dataset is used to fit a computational model, and the testing dataset is used to test the performance of the computational model. By using disjoint portions of the data for training and for testing, the performance of the computational model may be improved.

At step 708, the data training engine 103 obtains a rule set from the machine learning technique that is performed on the training dataset. The rule set corresponds to the computational model, and as described in detail in relation to FIG. 2, the rule set defines how to assign scores to various combinations of one or more user features and one or more advertisement features. The rule set obtained at step 708 is provided over the network 102 to the score evaluator engine 101, which applies the rule set in the form of the computational model to a set of candidate advertisements and user feature data that is collected in real time from the data collector 110. The real-time user feature data may be associated with unknown or uncertain amounts of user involvement for the different candidate advertisements, and the rule set provides a prediction of the amounts of user involvement in the form of a score for each candidate advertisement. In this manner, the rule set trained by the method 700 allows for prediction of an amount or degree of user involvement that the real time individual will interact with an advertisement.

Figure 8:
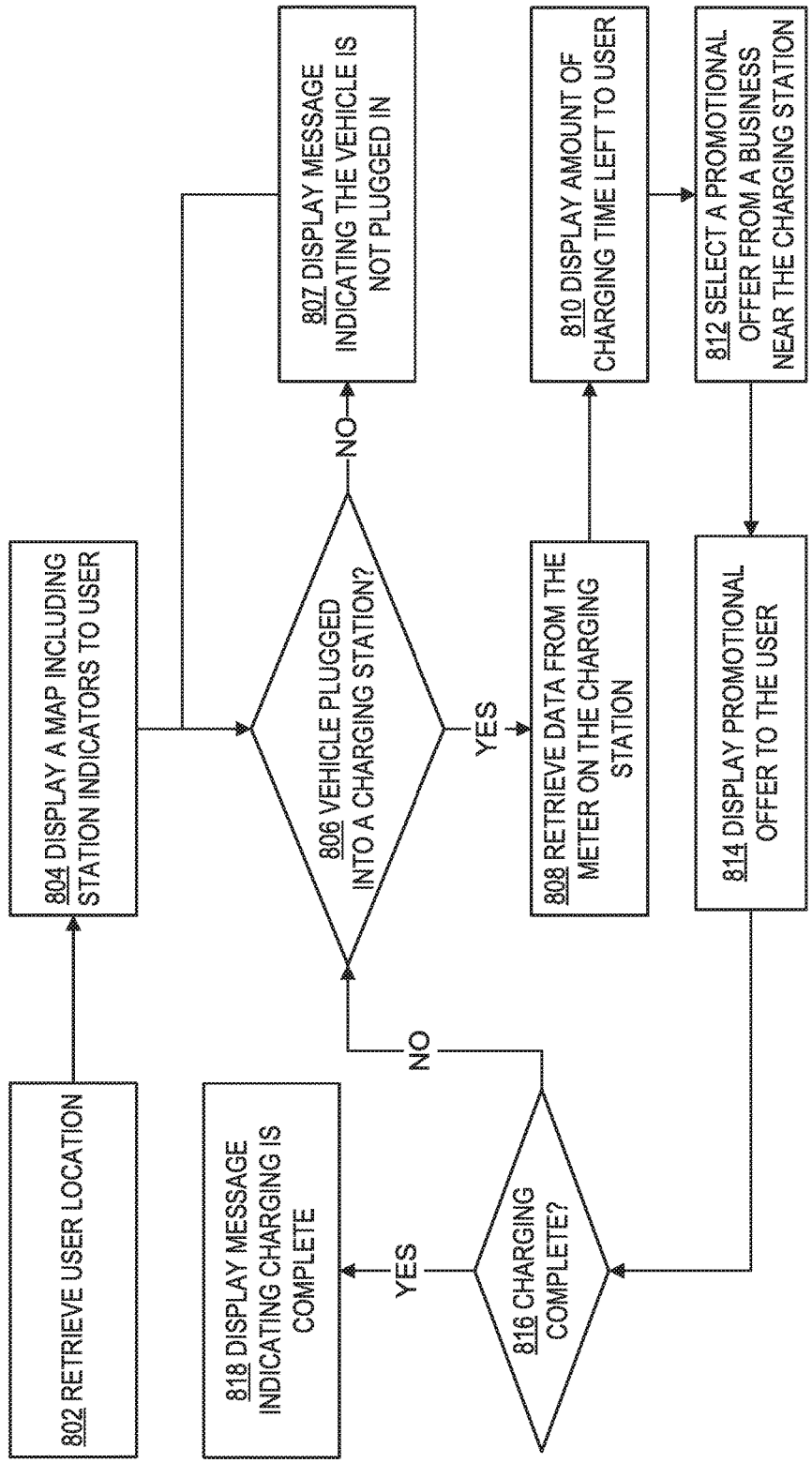
FIG. 8 is a flowchart of a method used by a computerized system to display various messages in relation to a charging process, according to an illustrative implementation.

FIG. 8 is a flowchart of an illustrative method 800 for displaying messages to a user. The method 800 may be performed by the user device 111 and includes the steps of retrieving the user's location (step 802), displaying a map including station indicators to the user (step 804), and determining whether a vehicle is plugged into a charging station (decision block 806). If not, a message is displayed indicating that the vehicle is not plugged in (step 807). Otherwise, if the vehicle is plugged into the charging station, data from the meter on the charging station is retrieved (step 808), an amount of charging time left is displayed to the user (step 810), a promotional offer from a business near the charging station is selected (step 812), and the promotional offer is displayed to the user (step 814). When charging is complete (decision block 816), a message is displayed to the user indicating that charging is complete (step 818).

At step 802, the user's location is retrieved. In an example, the user device 111 may be a mobile device such as a phone that has location identifying capabilities (such as a GPS signal, for example). At step 804, the user device 111 displays a map of the user's current location to the user. The map includes station indicators that point out the various locations of charging stations that are near the user's current location. In some embodiments the map displayed on the user device 111 includes different indicators for available charging stations and unavailable charging stations. A charging station 108 may be unavailable if it is currently in use by another user who has an electric vehicle plugged in to the respective charging station 108. The charging station 108 may be unavailable if it is currently down for maintenance or is otherwise being serviced. The map displayed on the user device 111 may further include an timing indicator that describes an estimated amount of time left until an unavailable charging station becomes available. Distinguishing between available and unavailable charging stations on the map displayed over the user device 111 is advantageous because the driver is likely to be interested in available charging stations.

At decision block 806, the user device 111 determines whether a vehicle associated with a user account is plugged into a charging station. In particular, the user may access a user account over the user device 111, and the user account may be associated with user information and vehicle information. When the user's vehicle is plugged into the charging station 108, the user device 111 may provide an indication on its display that the vehicle is plugged in. If the vehicle is not plugged in, the user device 111 may display a message indicating that the vehicle associated with the user's account is not plugged into any charging station, and may provide navigation instructions to the location of the nearest available charging station to the driver. When the driver arrives at the charging station 108 and plugs in his electric vehicle into the power source 114, the charging station 108 may transmit a signal over the network 102 to the user device 111 to indicate that the vehicle is charging. Upon receiving the signal, the user device 111 may display an indication or a message on its display to the user that indicates that the vehicle is charging.

At step 808, the user device 111 retrieves the data from the meter 112 on the charging station 112. In particular, the meter data collected by the meter 112 on the charging station 108 is transmitted over the network 102 for display on the user device 111 at step 810. The meter data may include an amount of charging remaining. This may correspond to an estimated length of time before charging is complete, an amount of power (in absolute terms or as a percentage or a fraction) that remains to charge, or any other suitable indication of an amount of remaining charge. In some embodiments, charging is defined to be complete when the electric vehicle is fully charged. Alternatively, a time limit may be set on the charging station 108 such that a vehicle is not allowed to be plugged in for more than a fixed amount of time. In this case, the charging station 108 may detect that a vehicle has been plugged in for longer than a threshold amount of time, and may automatically stop the charging process, or may disconnect the plug to the vehicle.

At step 812, a promotional offer from a business located near the charging station is selected, and displayed on the user device 111 to the user at step 814. The promotional offer may be associated with the user account, and may include a discount or a coupon for an item at the local business. In some embodiments, multiple promotional offers from different local business are displayed on the user device 111, and the user may select any one or more of the displayed offers to use. The promotional offers that are selected to be displayed on the user device 111 may be selected based on the location of the business and meter data from the charging station 108. In particular, promotional offers associated with nearby businesses may be displayed if the meter data indicates that there is little time remaining until the charging is complete. Promotional offers with businesses in locations further from the charging station 108 may be displayed if the meter data indicates that there is substantial time remaining until charging is complete. The businesses that provide the promotional offers may be limited to those within a walking distance of the charging station 108. In some embodiments, if the server 104 detects that the user selects one or more of the promotional offers, the server 104 may determine that the user is not interacting with the display 120, and may switch to an advertising mode that targets other individuals, such as the mode that is described in relation to FIG. 5.

At decision block 816, the user device 111 determines whether charging is complete, and if so, displays a message indicating that charging of the vehicle is complete at step 818. As is described above, charging may be defined to be complete when the vehicle is fully charged, or when a time limit is reached. Otherwise, if charging is not complete, the method 800 returns to decision block 806 to determine whether the vehicle is still plugged into the charging station 108. If the vehicle is unplugged after being plugged in, the user device 111 displays a message at step 807 to inform the user that the vehicle is unplugged. This is particularly useful if the user has left the charging station 108 (to redeem a promotional offer, for example), and the unplugging is unintentional or undesired.

Figure 9:
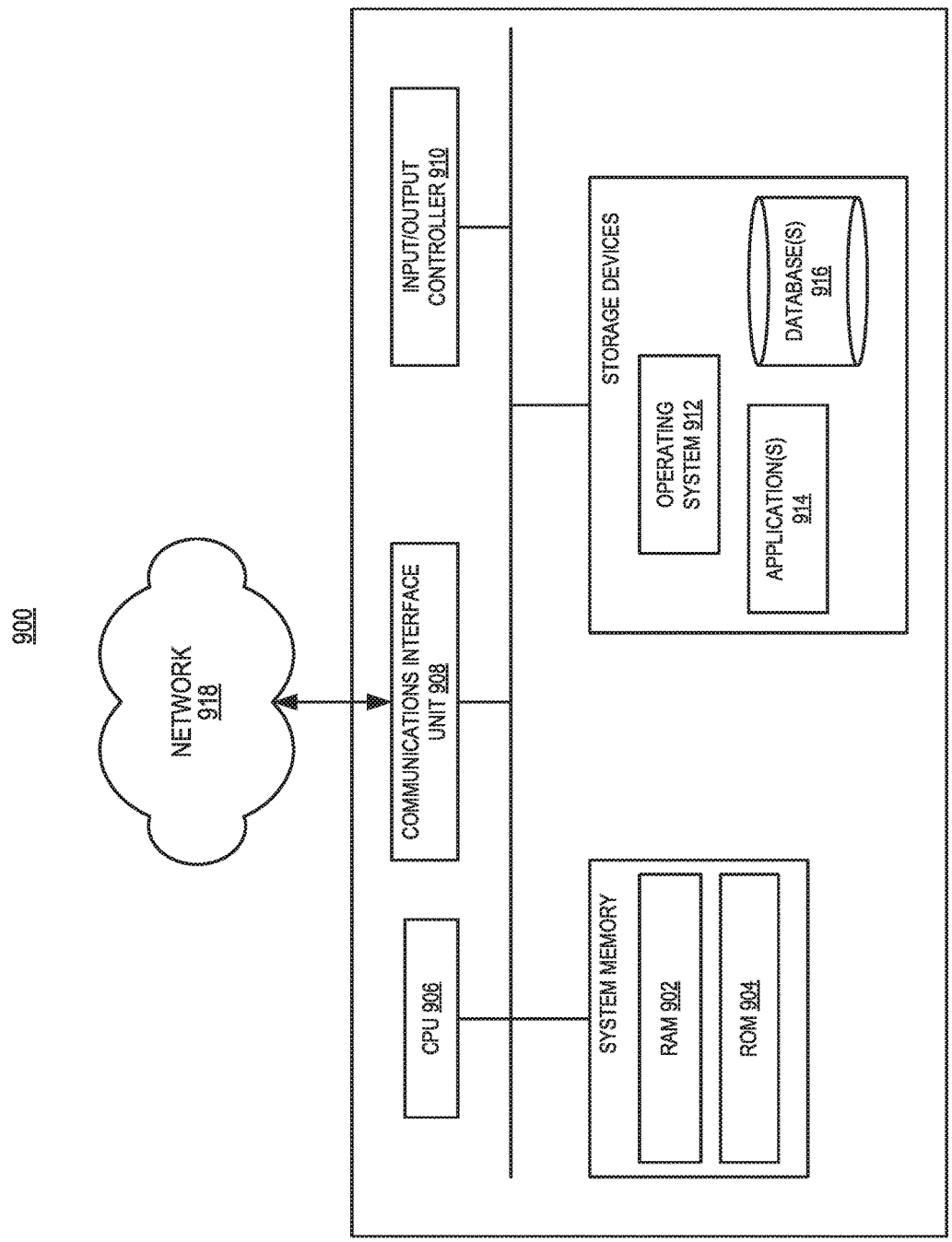
FIG. 9 is a block diagram of a computing device for performing any of the processes described herein, according to an illustrative implementation.

FIG. 9 is a block diagram of a computing device, such as any of the components of the systems of FIG. 1, for performing any of the processes described herein. Each of the components of these systems may be implemented on one or more computing devices 900. In certain aspects, a plurality of the components of these systems may be included within one computing device 900. In certain implementations, a component and a storage device may be implemented across several computing devices 900.

The computing device 900 comprises at least one communications interface unit, an input/output controller 910, system memory, and one or more data storage devices. The system memory includes at least one random access memory (RAM 902) and at least one read-only memory (ROM 904). All of these elements are in communication with a central processing unit (CPU 906) to facilitate the operation of the computing device 900. The computing device 900 may be configured in many different ways. For example, the computing device 900 may be a conventional standalone computer or alternatively, the functions of computing device 900 may be distributed across multiple computer systems and architectures. In FIG. 9, the computing device 900 is linked, via network or local network, to other servers or systems.

The computing device 900 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 908 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 906 comprises a processor, such as one or more conventional microprocessors and one or more supplementary co-processors such as math co-processors for offloading workload from the CPU 906. The CPU 906 is in communication with the communications interface unit 908 and the input/output controller 910, through which the CPU 906 communicates with other devices such as other servers, user terminals, or devices. The communications interface unit 908 and the input/output controller 910 may include multiple communication channels for simultaneous communication with, for example, other processors, servers or client terminals.

The CPU 906 is also in communication with the data storage device. The data storage device may comprise an appropriate combination of magnetic, optical or semiconductor memory, and may include, for example, RAM 902, ROM 904, flash drive, an optical disc such as a compact disc or a hard disk or drive. The CPU 906 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 906 may be connected to the data storage device via the communications interface unit 908. The CPU 906 may be configured to perform one or more particular processing functions.

The data storage device may store, for example, (i) an operating system 912 for the computing device 900; (ii) one or more applications 914 (e.g., computer program code or a computer program product) adapted to direct the CPU 906 in accordance with the systems and methods described here, and particularly in accordance with the processes described in detail with regard to the CPU 906; or (iii) database(s) 916 adapted to store information that may be utilized to store information required by the program.

The operating system 912 and applications 914 may be stored, for example, in a compressed, an uncompiled and an encrypted format, and may include computer program code. The instructions of the program may be read into a main memory of the processor from a computer-readable medium other than the data storage device, such as from the ROM 904 or from the RAM 902. While execution of sequences of instructions in the program causes the CPU 906 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions described herein. The program also may include program elements such as an operating system 912, a database management system and "device drivers" that allow the processor to interface with computer peripheral devices (e.g., a video display, a keyboard, a computer mouse, etc.) via the input/output controller 910.

The term "computer-readable medium" as used herein refers to any non-transitory medium that provides or participates in providing instructions to the processor of the computing device 900 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 906 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 900 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It is to be understood that while various illustrative implementations have been described, the forgoing description is merely illustrative and does not limit the scope of the invention. While several examples have been provided in the present disclosure, it should be understood that the disclosed systems, components and methods of manufacture may be embodied in many other specific forms without departing from the scope of the present disclosure. In particular, the present disclosure has been described in the context of providing targeted advertisements to a charging station for electric vehicles. However, one of ordinary skill in the art will understand that the systems and methods described herein are not limited to charging stations for electric vehicles, and may be adapted or modified to be used in any system in which user data is received and used to determine a suitable targeted advertisement for individuals or groups. For example, the present disclosure may be applied to systems that already receive user data, such as shopping data, internet browsing data, or any other suitable user data. The present disclosure may augment that user data with additional data regarding a level of user interaction with an advertisement to provide targeted advertisements that are tailored specifically for an individual or a group of individuals.

The examples disclosed can be implemented in sub-combinations with one or more other features described herein. A variety of apparatus, systems and methods may be implemented based on the disclosure and still fall within the scope of the invention. Also, the various features described or illustrated above may be combined or integrated in other systems or certain features may be omitted, or not implemented.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

The invention claimed is:

1. A server system in communication with an electric vehicle charging station that includes a display, the server system comprising:
    a communications interface;
    one or more processors; and
    memory storing instructions for:
        receiving, via the communications interface, a computational model that predicts a relative length of time that an individual will engage with a candidate advertisement of a plurality of candidate advertisements, wherein:
            the computational model is generated based on data collected from a plurality of individuals, a plurality of advertisements, and measured lengths of time that the plurality of individuals engaged with the plurality of advertisements;
            a plurality of features characterize each individual in the plurality of individuals; and
            a plurality of advertisement features characterize each advertisement in the plurality of advertisements;
        determining that an electric vehicle is charging at the electric vehicle charging station;
        determining whether a length of time remaining for charging the electric vehicle at the electric vehicle charging station is above a threshold;
        in accordance with a determination that the length of time remaining is above the threshold:
            retrieving, in real time, based on data recorded by a sensor coupled to the charging station, a plurality of features for an individual that is not associated with the electric vehicle plugged into the electric vehicle charging station;
            using the computational model, selecting a first advertisement from a plurality of candidate advertisements to target the individual that is not associated with the electric vehicle plugged into the electric vehicle charging station based on the retrieved features for the individual that is not associated with the electric vehicle plugged into the electric vehicle charging station; and
            providing the first advertisement to the display of the electric vehicle charging station;
        in accordance with a determination that the length of time remaining is not above the threshold:

retrieving, in real time, a plurality of features for a user that is associated with the electric vehicle plugged into the electric vehicle charging station that characterize the user;

using the computational model, selecting a second advertisement from the plurality of candidate advertisements, different from the first advertisement, to target the user that is associated with the electric vehicle plugged into the electric vehicle charging station based on the retrieved user features for the user; and providing the second advertisement to the display of the electric vehicle charging station.

2. The server system of claim 1, wherein the memory further stores instructions for receiving, in real time, an indication that the individual that is not associated with the electric vehicle plugged into the electric vehicle charging station is interacting with the display.

3. The server system of claim 1, wherein determining whether the length of time remaining for charging the electric vehicle at the electric vehicle charging station is above the threshold includes receiving meter data, from a meter at the charging station, wherein the meter data provides an estimated length of time until electric vehicle charging at the charging station is complete.

4. The server system of claim 1, wherein the computational model selects a respective advertisement from the plurality of candidate advertisements based on optimizing a plurality of scores, the plurality of scores indicative of the plurality of features for the target user or individual that is not associated with the electric vehicle plugged into the electric vehicle charging station and a predicted relative length of time of engagement for the target user that is associated with the electric vehicle plugged into the electric vehicle charging station or individual that is not associated with the electric vehicle plugged into the electric vehicle charging station.

5. The server system of claim 1, the memory further stores instructions for:
  determining that an electric vehicle is not charging at the electric vehicle charging station;
  in accordance with the determination that an electric vehicle is not charging at the electric vehicle charging station, selecting to target a second individual that is not associated with the electric vehicle plugged into the electric vehicle charging station;
  retrieving, in real time, based on data recorded by the sensor coupled to the charging station, a plurality of features for the second individual that is not associated with the electric vehicle plugged into the electric vehicle charging station;
  using the computational model, selecting a third advertisement from the plurality of candidate advertisements, different from the first advertisement and the second advertisement, to target the second individual that is not associated with the electric vehicle plugged into the electric vehicle charging station based on the retrieved features for the second individual that is not associated with the electric vehicle plugged into the electric vehicle charging station; and
  providing the third advertisement to the display of the electric vehicle charging station.

6. The server system of claim 1, wherein the predicted relative length of time corresponds to an amount of user involvement with the display, and a respective advertisement from the plurality of candidate advertisement is selected to be provided to the display in response to determining that the predicted relative length of time exceeds a threshold.

7. The server system of claim 6, wherein the amount of user involvement includes the predicted relative length of time and a predicted relative extent of engagement between the user or individual that is not associated with the electric vehicle plugged into the electric vehicle charging station and the respective advertisement.

8. The server system of claim 1, wherein the memory further stores instructions for:
  determining whether the user or individual that is not associated with the electric vehicle plugged into the electric vehicle charging station is engaging with the selected advertisement, including determining whether the selected individual is facing the display; and
  determining the length of time that the user or individual that is not associated with the electric vehicle plugged into the electric vehicle charging station faces the display, wherein the computational model is updated according to the determined length of time, the plurality of retrieved features, and a plurality of advertisement features that characterize the selected advertisement.

9. The server system of claim 1, wherein the charging station is a first charging station, the memory further stores instructions for:
  detecting that the user or individual that is not associated with the electric vehicle plugged into the electric vehicle charging station is leaving a vicinity of the first charging station and moving in a direction of a second charging station; and
  transmitting a signal indicative of the selected advertisement to the second charging station.

* * * * *